(12) United States Patent
Jia et al.

(10) Patent No.: US 8,644,412 B2
(45) Date of Patent: *Feb. 4, 2014

(54) INTERFERENCE-WEIGHTED COMMUNICATION SIGNAL PROCESSING SYSTEMS AND METHODS

(75) Inventors: Ming Jia, Ottawa (CA); Wen Tong, Ottawa (CA); Dong-Shen Yu, Ottawa (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/562,507

(22) Filed: Jul. 31, 2012

(65) Prior Publication Data

US 2012/0294349 A1    Nov. 22, 2012

Related U.S. Application Data

(63) Continuation of application No. 13/240,727, filed on Sep. 22, 2011, now Pat. No. 8,259,881, which is a continuation of application No. 10/739,044, filed on Dec. 19, 2003, now Pat. No. 8,027,417.

(51) Int. Cl.
*H04B 7/02* (2006.01)
*H04B 1/10* (2006.01)

(52) U.S. Cl.
USPC .......................................... 375/267; 375/346

(58) Field of Classification Search
USPC .................. 375/260, 267, 299, 347, 346, 348
See application file for complete search history.

(56) References Cited

U.S. PATENT DOCUMENTS

| | | |
|---|---|---|
| 5,819,168 A | 10/1998 | Golden et al. |
| 6,141,393 A | 10/2000 | Thomas et al. |
| 6,441,786 B1 * | 8/2002 | Jasper et al. .................. 342/383 |
| 6,757,241 B1 | 6/2004 | Jones et al. |
| 6,801,580 B2 | 10/2004 | Kadous |
| 6,826,240 B1 | 11/2004 | Thomas et al. |
| 6,853,629 B2 | 2/2005 | Alamouti et al. |
| 6,895,060 B2 | 5/2005 | Kroeger et al. |

(Continued)

FOREIGN PATENT DOCUMENTS

| | | |
|---|---|---|
| EP | 1 320 212 | 6/2003 |
| WO | 03/030402 | 4/2003 |

OTHER PUBLICATIONS

Casella, Ivan R.S., et al., "Equalization pos-combining with channel estimation and mimo joint equalization combining receivers for space-time block coding in frequency selective channels," The 14th IEEE International Symposium on Personal, Indoor and Mobile Radio Communications (PIMRC 2003), Piscataway, NJ, Sep. 1, 2003, pp. 1317-1321.

(Continued)

*Primary Examiner* — Don N Vo
(74) *Attorney, Agent, or Firm* — Womble Carlyle Sandridge & Rice, LLP

(57) ABSTRACT

A level of interference affecting signal components of received communication signals is estimated and used to weight the signal components. The signal components in a each of a number of groups of signal components are weighted based on respective interference estimates to thereby adjust signal components for colored interference, which may vary significantly between different groups of signal components. Each group of signal components may include a single component or components within a relatively narrow sub-band of the communication signals, such as a coherence bandwidth of an Orthogonal Frequency Division Multiplexing (OFDM) signal.

39 Claims, 2 Drawing Sheets

(56) References Cited

U.S. PATENT DOCUMENTS

| | | |
|---|---|---|
| 6,947,715 B2 | 9/2005 | Kolze |
| 6,985,434 B2 | 1/2006 | Wu et al. |
| 7,072,413 B2 | 7/2006 | Walton et al. |
| 7,092,431 B2 | 8/2006 | Maeda et al. |
| 7,103,119 B2 | 9/2006 | Matsuoka et al. |
| 7,133,459 B2 | 11/2006 | Onggosanusi et al. |
| 7,154,936 B2 | 12/2006 | Bjerke et al. |
| 7,164,696 B2 | 1/2007 | Sano et al. |
| 7,177,377 B2 | 2/2007 | Wu et al. |
| 7,215,704 B2 | 5/2007 | Fujii et al. |
| 7,221,722 B2 | 5/2007 | Thomas et al. |
| 7,227,906 B2 | 6/2007 | Fukuda et al. |
| 7,266,168 B2 | 9/2007 | Kwak et al. |
| 7,298,805 B2 | 11/2007 | Walton et al. |
| 7,324,437 B1 | 1/2008 | Czylwik et al. |
| 7,327,795 B2 | 2/2008 | Oprea |
| 7,333,575 B2 | 2/2008 | Papadimitriou et al. |
| 7,359,311 B1 | 4/2008 | Paranjpe et al. |
| 7,386,032 B2 | 6/2008 | Fitton et al. |
| 7,428,280 B2 | 9/2008 | Aoki et al. |
| 7,447,285 B2 | 11/2008 | Matsumoto et al. |
| 7,555,067 B2 | 6/2009 | Jeong |
| 7,787,514 B2 | 8/2010 | Shattil |
| 7,873,326 B2 | 1/2011 | Sadr |
| 7,881,412 B2 | 2/2011 | Banister |
| 7,937,057 B2 | 5/2011 | Kishigami et al. |
| 8,027,417 B2 | 9/2011 | Jia et al. |
| 8,259,881 B2 * | 9/2012 | Jia et al. .................. 375/347 |
| 2002/0110206 A1 | 8/2002 | Becker et al. |
| 2002/0154705 A1 | 10/2002 | Walton et al. |
| 2004/0028121 A1 | 2/2004 | Fitton |
| 2004/0174939 A1 * | 9/2004 | Wang ....................... 375/316 |
| 2008/0043680 A1 | 2/2008 | Fitton |
| 2010/0040172 A1 * | 2/2010 | Onggosanusi et al. ....... 375/299 |
| 2011/0080976 A1 * | 4/2011 | Onggosanusi et al. ....... 375/299 |
| 2011/0107171 A1 | 5/2011 | Mashino et al. |

OTHER PUBLICATIONS

Fazel, Khaled, "Narrow-band interference rejection in orthogonal multi-carrier spread spectrum communications," Third Annual International Conference on Universal Communications Record, Sep. 27-Oct. 1, 1994, pp. 46-50.

Wang, Haifeng et al., "Equalization parallel interference cancellation for MIMO MC-CDMA downlink transmissions," The 14th IEEE International Symposium on Personal, Indoor and Mobile Radio Communications (PIMRC 2003), 2-3, Piscataway, NJ, Sep. 7, 2003, pp. 1250-1254, Figures 1, 2.

International Search Report for PCT/G82004/005356 mailed Mar. 31, 2005, 3 pages.

Lee, King F., et al.. "A space-time coded transmitter diversity technique for frequency selective fading channels," Proceedings of the 2000 IEEE Sensor Array and Multichannel Signal Processing Workshop, Mar. 16-17, 2000, pp. 149-152.

Non-Final Rejection for U.S. Appl. No. 10/739,044 mailed Apr. 30, 2009, 12 pages.

Non-Final Rejection for U.S. Appl. No. 10/739,044 mailed Jun. 7, 2010, 14 pages.

Non-Final Rejection for U.S. Appl. No. 10/739,044 mailed Nov. 23. 2010, 12 pages.

Non-Final Rejection for U.S. Appl. No. 10/739,044 mailed Nov. 24, 2009. 12 pages.

Non-Final Rejection for U.S. Appl. No. 10/739,044 mailed Apr. 1, 2008, 14 pages.

Non-Final Rejection for U.S. Appl. No. 10/739,044 mailed Oct. 14, 2008, 14 pages.

Notice of Allowance for U.S. Appl. No. 10/739,044 mailed Apr. 22, 2011, 10 pages.

Notice of Allowance for U.S. Appl. No. 10/739,044 mailed Jul. 21, 2011, 10 pages.

* cited by examiner

INTERFERENCE-WEIGHTED COMMUNICATION SIGNAL PROCESSING SYSTEMS AND METHODS

The present patent application is a continuation of U.S. patent application Ser. No. 13/240,727, entitled INTERFERENCE-WEIGHTED COMMUNICATION SIGNAL PROCESSING SYSTEMS AND METHODS, filed Sep. 22, 2011, now U.S. Pat. No. 8,259,881 which is itself a continuation of U.S. patent application Ser. No. 10/739,044, now issued as U.S. Pat. No. 8,027,417, entitled INTERFERENCE-WEIGHTED COMMUNICATION SIGNAL PROCESSING SYSTEMS AND METHODS, filed Dec. 19, 2003, both of which are incorporated herein by reference in their entirety.

FIELD OF THE INVENTION

This invention relates generally to communication systems and, in particular, to processing of received communication signals.

BACKGROUND

Many communication signal processing systems and techniques are based on assumptions regarding noise and interference. In Orthogonal Frequency Division Multiplexing (OFDM) systems, for example, received signal processing typically assumes Additive White Gaussian Noise (AWGN) that is constant across all sub-carriers or tones. In the presence of dispersive channels for both a desired communication signal and one or more interference signals, however, interference tends not to be constant across channels. This phenomenon is often referred to as "coloured" interference. Interference caused by a single interference source can be coloured in the frequency domain, due to multi-path effects, for example.

Conventional signal processing operations such as decoding and demodulation of received signals are affected when these basic interference assumptions do not hold. In the above example of OFDM systems, information is often modulated onto sub-carriers at a transmitter using Quadrature Amplitude Modulation (QAM) techniques. Conventional QAM demapping or demodulation of information from received signals in the presence of coloured interference leads to increased block or bit error rates (BLER/BER). Resultant performance losses can be on the order of about a 7-9 dB carrier to interference (CIR) penalty for a particular BLER or BER error floor.

One example type of communication system that is particularly prone to coloured interference is multiple-cell and multiple-access OFDM communication systems, generally referred to as OFDMA systems, in which frequency hopping is used by neighbouring cells and the hopping patterns are not orthogonal. In such systems, it is possible that mobile stations in adjacent cells may hop to the same sub-carrier at the same time, resulting in a relatively high level of interference on that sub-carrier but not necessarily on other sub-carriers. If sufficient information about interference sources, mainly channel state information, is available, then interference can be cancelled. However, the cost of interference cancellation in terms of signal processing can be significant. In addition, for up-link transmissions from mobile stations to base stations, it is unlikely that each base station can know the behaviour of all the mobile stations in its neighbouring cells. Therefore, cancellation of such inter-cell interference is not a practical option.

One way to reduce inter-cell interference is by scheduling mobile stations in coordinated patterns for neighbouring cells. Combined with up-link power control, coordination of mobile stations can mitigate inter-cell interference to a certain degree, but introduces additional communication system requirements to provide for such control of mobile station operations across different cells.

SUMMARY OF THE INVENTION

According to one aspect of the invention, a communication signal receiver includes an interference estimator and a communication signal processing module. The interference estimator estimates interference in received communication signals. The communication signal processing module receives communication signals that include multiple signal components and weights the signal components in each of a number of groups of signal components based on respective interference estimates from the interference estimator to thereby adjust signal components for coloured interference.

Each of the groups of signal components includes at least one signal component. In a preferred embodiment, the communication signals are OFDM signals and the signal components are sub-carrier signals. In a further preferred embodiment, the groups of signal components include sub-carrier signals within a coherence bandwidth of the OFDM signals.

The communication signal processing module may include a decoder connected to the interference estimator and an antenna system. The decoder is preferably an Space-Time Transmit Diversity (STTD) decoder, a Multiple Input Multiple Output (MIMO) decoder, or some other type of diversity decoder.

In accordance with a preferred embodiment of the invention, the decoder combines weighted signal components of different received communication signals to generate decoded communication signals. In another embodiment, the communication processing module also includes a demodulator connected to the decoder for demodulating decoded communication signal components output from the decoder and a multiplier connected to the demodulator and to the interference estimator for weighting groups of demodulated communication signal components output from the demodulator based on respective interference estimates from the interference estimator. The demodulator is preferably a QAM demodulator or a Quadrature Phase Shift Keying (QPSK) demodulator.

The invention also provides, in another aspect, a method of processing communication signals. Communication signals having multiple signal components are received, and interference affecting the received communication signals is estimated. Groups of the signal components are then weighted using respective interference estimates. The method may be embodied, for example, in a computer program product having a computer-readable medium storing instructions for performing the method.

Other aspects and features of the present invention will become apparent to those ordinarily skilled in the art upon review of the following description of the specific embodiments of the invention.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
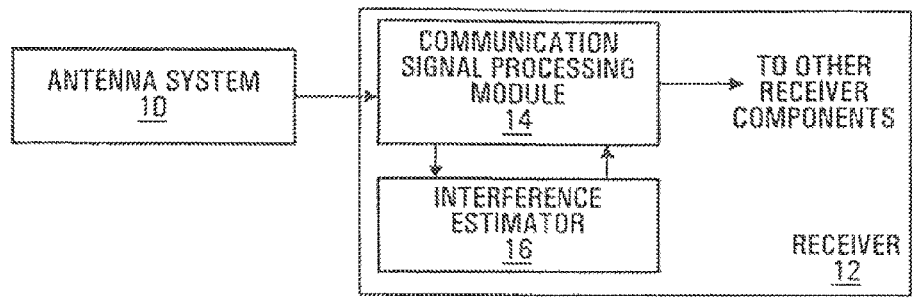
FIG. 1 is block diagram of a communication signal receiver system incorporating an embodiment of the invention.

FIG. 1 is block diagram of a communication signal receiver system incorporating an embodiment of the invention. An antenna system 10 is connected to a communication signal processing module 14 in the receiver 12. The communication signal processing module 14 is also connected to an interference estimator 16 and to other components of the receiver 12. Although shown as separate blocks in FIG. 1, the communication signal processing module 14 and the interference estimator 16 may be implemented in a single processor, as software or in a digital signal processor (DSP), for example.

It should be appreciated that the communication signal receiver system as shown in FIG. 1 is solely for illustrative purposes. Actual implementations of the present invention may include further, fewer, or different components than those shown in FIG. 1. For instance, many communication devices use the same antenna for receiving and transmitting communication signals, such that the antenna 10 is connected to both the receiver 12 and a transmitter (not shown) or to a transceiver incorporating the receiver 12. The nature and operation of receiver components will also be different for receivers configured to receive different types of communication signal, such as receivers designed to operate within different types of communication networks.

Although a single antenna system 10 is shown in FIG. 1, more than one receiving antenna may be provided therein. In one embodiment, a single antenna receives communication signals from one or more transmitting antennas (not shown). According to other embodiments, multiple antennas are connected to the receiver 12 and configured to receive communication signals from one or more transmitting antennas. For example, in a 2-by-1 Space-Time Transmit Diversity (STTD) system, the antenna system 10 includes a single antenna for receiving communication signals from two transmitting antennas. In a 2-by-2 STTD system, two antennas are provided and configured to receive communication signals from two transmitting antennas. Similarly, in 1-by-2 receive diversity systems, two antennas are adapted to receive communication signals from one transmitting antenna. Multiple Input Multiple Output (MIMO) systems also employ multiple receiving and transmitting antennas. Other receiving and transmitting antenna arrangements in conjunction with which embodiments of the present invention may be implemented will be apparent to those skilled in the art.

The communication signal processing module 14 performs such processing operations as decoding and/or demodulation of received signals into formats suitable for other receiver components. As will be apparent to those skilled in the art, the receiver 12 will typically be connected to other components in a communication device and performs any operations necessary to provide communication signals or the information contained therein to the other components. Information in a communication signal might be destined for a software application being executed by a processor in a mobile station, for example.

In a preferred embodiment, the communication signal processing module 14 is implemented at least partially in software, stored in a computer-readable memory, that is executable by a processor. One such contemplated implementation of the communication signal processing module 14 is a digital signal processor (DSP), which may also perform other operations in addition to those described herein. According to an alternative embodiment, a processor of a communication device in which the receiver 12 is implemented is configured to execute communication signal processing software.

As described above, communication signals are often affected by interference. Although the antenna system 10 is intended to receive desired communication signals, interference signals are also received. The interference estimator 16, in accordance with an embodiment of the invention, estimates interference in received communication signals and provides interference estimates, or interference weights based on interference estimates, to the communication signal processing module 14. The interference estimates or weights are then used by the communication signal processing module 14 in subsequent processing of a received communication signal, as described in further detail below. Where weights are calculated by the interference estimator 16, the interference estimator 16 comprises, or can be considered to be, a weight generator that determines interference weights.

Returning to the above illustrative example of OFDM and OFDMA systems, a communication signal is spread over multiple sub-carriers and thus comprises a plurality of signal components. The common assumption that interference is constant over all sub-carriers is not always valid, especially in systems such as IEEE 802.16 and Universal Mobile Telecommunications System (UMTS) where fast sub-carrier hopping is applied. It will be apparent to those skilled in the art that "IEEE 802.16" refers to a set of specifications, available from the Institute of Electrical and Electronics Engineers (IEEE), relating to wireless Metropolitan Area Networks (MANs). In an embodiment of the invention for OFDM or OFDMA, the interference estimator 16 estimates interference at each sub-carrier in the communication signal, and the received signal processing module 16 processes the communication signal using the interference estimates or weights calculated using such estimates. For example, in one embodiment of the invention suitable for QAM-based OFDM or OFDMA, interference weights for each sub-carrier are generated by the interference estimator 16 and used in soft QAM demodulation, also referred to as soft demapping.

Figure 2:
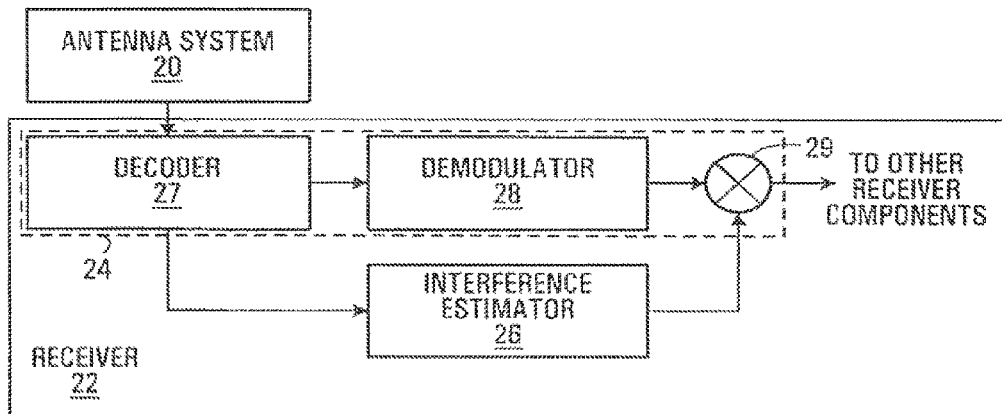
FIG. 2 is a block diagram of an example of a communication signal processing module and an interference estimator according to an embodiment of the invention.

FIG. 2 is a block diagram of an example of a communication signal processing module and an interference estimator according to an embodiment of the invention. As shown, an antenna system 20 is connected to a receiver 22, which includes an interference estimator 26 and a communication signal processing module 24. The communication signal processing module 24 includes a decoder 27 connected at its output to both a demodulator 28 and the interference estimator 26 and a multiplier 29 connected to the outputs of the interference estimator 26 and the demodulator 28.

The particular embodiment shown is illustrative of one type of implementation of the invention, in which interference estimates are used to weight demodulated communication signals. As will become apparent from the following description, the invention is in no way limited to such an implementation. Interference estimates may be used in other signal processing operations, and in receivers having components other than those specifically shown in FIG. 2. For example, not all types of receiver include both a decoder 27 and a demodulator 28. In addition, conversions between time and frequency domain signals are typically facilitated by such transforms as the Fast Fourier Transform (FFT) and Inverse FFT (IFFT). Those skilled in the art will be familiar with such signal operations and their application to communication signal processing.

The antenna system 20 and the interference estimator 26 are substantially similar to the antenna system 10 and the interference estimator 16 described above. The antenna system 20 represents one or more antennas for receiving communication signals from one or more transmitters (not shown), and the interference estimator 26 estimates the interference in received communication signals.

The decoder 27 is, for instance, a space-time decoder in an STTD system that decodes received communication signals from one or more communication channels into modulation symbols. In OFDM and OFDMA systems, the decoder 27 decodes symbols from a plurality of sub-carriers over which communication signals are spread. As will be apparent to those skilled in the art, a decoding algorithm implemented in the decoder 27 is the inverse of an encoding algorithm used at a transmitter from which a received communication signal is received.

The demodulator 28 processes modulation symbols in the decoded signals to extract information that was modulated onto a signal by a transmitter, and is sometimes referred to as a demapper. In OFDM and OFDMA systems for instance, information is modulated onto a plurality of sub-carriers. QAM is one modulation scheme that is commonly used in OFDM and OFDMA. In a QAM-based OFDM or OFDMA system, the demodulator 28 is a QAM demodulator.

In the system of FIG. 2, the multiplier 29 applies interference estimates or interference weights from the interference estimator 26 to demodulated signals output from the demodulator 28. The demodulated signals are thereby adjusted for interference, which is estimated based on received communication signals. The received signal processing module 24 is thus less dependent upon conventional assumptions of uniform interference.

The operation of the receiver of FIG. 2 will now be described in the context of a specific illustrative example of a 2-by-1 STTD QAM-based OFDM or OFDMA system, in which the antenna system 20 is configured to receive communication signals from two transmitting antennas (not shown), the decoder 27 is an STTD decoder, and the demodulator 28 is a soft QAM demapper. Generalization to other configurations such as 2-by-2 STTD, as well as non-STTD and/or non-QAM communication schemes will be straightforward to those skilled in the art. The interference weighting techniques described and claimed herein are not limited to any particular communication scheme. The detailed examples below are presented solely for illustrative purposes and are not intended to limit the scope of the invention.

At the receiver 22, un-normalized STTD decoder outputs from the decoder 27 for a 2-by-1 system can be expressed as in equation (1)

$$\tilde{s}_1(k)=(|h_1(k)|^2+|h_2(k)|^2)s_1(k)+h_1^*(k)n_1(k)+h_2(k)n_2^*(k)$$
$$\tilde{s}_2(k)=(|h_1(k)|^2+|h_2(k)|^2)s_2(k)-h_1(k)n_2^*(k)+h_2^*(k)n_1(k), \quad (1)$$

where
k is an index of OFDM/OFDMA sub-carriers;
$\tilde{s}_1(k)$ and $\tilde{s}_2(k)$ are the decoder outputs corresponding to communication signals received from the two transmitting antennas;
$h_1(k)$ and $h_2(k)$ are elements of the 2-by-1 STTD channel matrix; and
$n_1(k)$ and $n_2(k)$ represent interference affecting the communication signals received from the two transmitting antennas.

Where the variance of $n_i(k)$ is $\sigma_i^2(k)$, $h_1^*(k)n_1(k)$ and $h_2(k)n_2^*(k)$ are independent of each other, and $E[h_1^*(k)n_1(k)]=E[h_2(k)n_2(k)]=0$, then the noise power of $\tilde{s}_1(k)$ is $$\sigma^2(k)=(|h_1(k)|^2\sigma_1^2(k)+|h_2(k)|^2\sigma_2^2(k)). \quad (2)$$

Designating $\vec{b}(k)=[b_1(k)\ b_2(k)\ldots b_q(k)]$ as the q bits of a QAM symbol mapped to an actual transmitted signal $s_1(k)$ at a QAM modulator at a transmitter, a soft demapping formula for $\vec{b}(k)$ can be derived. As those skilled in the art will appreciate, the process for $s_2(k)$ demapping is obtained in a similar way. For the sake of simplicity, the sub-carrier index k is dropped from the following derivation. However, the results are applicable to each specific sub-carrier. Interference weighting is thus applicable on a per sub-carrier basis. Each sub-carrier signal component of a received communication signal is thereby weighted according to estimated interference.

It is known that the log likelihood ratio (LLR) for the lth element of $\vec{b}$, $b_l$, is given by $$\Lambda(b_l) = \log\frac{Pr[b_l=1\mid \vec{r}]}{Pr[b_l=0\mid \vec{r}]}, \quad (3)$$

where $\vec{r}$ represents a received communication signal. By substituting for the above interference statistics, equation (3) can be further expressed as $$\Lambda(b_l) = \log\frac{\sum_{s_1=f(\vec{b}),b_l=1} \exp\left(-\frac{|\tilde{s}_1-(|h_1|^2+|h_2|^2)s_1|^2}{2(|h_1|^2\sigma_1^2+|h_2|^2\sigma_2^2)}\right)}{\sum_{s_1=f(\vec{b}),b_l=0} \exp\left(-\frac{|\tilde{s}_1-(|h_1|^2+|h_2|^2)s_1|^2}{2(|h_1|^2\sigma_1^2+|h_2|^2\sigma_2^2)}\right)}. \quad (4)$$

Since it is impractical to calculate equation (4), max-log is normally used instead. This simplifies equation (4) to $$\Lambda(b_l) = \frac{\min_{s_1=f(\vec{b}),b_l=0}|\tilde{s}_1-(|h_1|^2+|h_2|^2)s_1|^2 - \min_{s_1=f(\vec{b}),b_l=1}|\tilde{s}_1-(|h_1|^2+|h_2|^2)s_1|^2}{|h_1|^2\sigma_1^2+|h_2|^2\sigma_2^2}. \quad (5)$$

A common assumption in conventional received signal processing techniques is that interference is constant (i.e., $\sigma_1^2=\sigma_2^2$) over an error-correcting code block used at a transmitter for encoding the communication signal. Equation (5) is then further simplified to $$\Lambda(b_l) = \min_{s_1=f(\vec{b}),b_l=0}\frac{|\tilde{s}_1-(|h_1|^2+|h_2|^2)s_1|^2 - \min_{s_1=f(\vec{b}),b_l=1}|\tilde{s}_1-(|h_1|^2+|h_2|^2)s_1|^2}{|h_1|^2+|h_2|^2}. \quad (6)$$

However, as described above, $\sigma_1^2$ and $\sigma_2^2$ vary from sub-carrier to sub-carrier for coloured interference systems.

In order to simplify implementation without making assumptions about interference characteristics, QAM demapping is performed after QAM normalization in accordance with an aspect of the invention. Thus, equation (5) can be expressed as $$\Lambda(b_l) = \frac{(|h_1|^2 + |h_2|^2)^2}{|h_1|^2 \sigma_1^2 + |h_2|^2 \sigma_2^2} \quad (7)$$
$$\left( \min_{s_1 = f(b), b_l = 0} \left| \frac{\tilde{s}_1}{|h_1|^2 + |h_2|^2} - s_1 \right|^2 - \min_{s_1 = f(b), b_l = 1} \left| \frac{\tilde{s}_1}{|h_1|^2 + |h_2|^2} - s_1 \right|^2 \right).$$

As above, a conventional assumption of $\sigma_1^2 = \sigma_2^2$ being constant over a code block allows equation (7) to be simplified to $$\Lambda(b_l) = (|h_1|^2 + |h_2|^2) \left( \min_{s_1 = f(b), b_l = 0} \left| \frac{\tilde{s}_1}{(|h_1|^2 + |h_2|^2)} - s_1 \right|^2 - \min_{s_1 = f(b), b_l = 1} \left| \frac{\tilde{s}_1}{(|h_1|^2 + |h_2|^2)} - s_1 \right|^2 \right). \quad (8)$$

For a coloured interference system, however, interference is not constant over a code block, and QAM soft-demapping is preferably divided into two steps:
1) calculate LLR based on a normalized STTD output, from equation (8)

$$\tilde{\Lambda}(b_l) = \quad (9)$$
$$\min_{s_1 = f(b), b_l = 0} \left| \frac{\tilde{s}_1}{(|h_1|^2 + |h_2|^2)} - s_1 \right|^2 - \min_{s_1 = f(b), b_l = 1} \left| \frac{\tilde{s}_1}{(|h_1|^2 + |h_2|^2)} - s_1 \right|^2;$$

and
2) weight $\tilde{\Lambda}(b_1)$ with estimated interference power $$\Lambda(b_1) = \alpha \tilde{\Lambda}(b_1), \quad (10)$$

when $$\alpha = \frac{(|h_1|^2 + |h_2|^2)^2}{|h_1|^2 \sigma_1^2 + |h_2|^2 \sigma_2^2}. \quad (11)$$

Where $\sigma_1^2 = \sigma_2^2$, i.e., the noise/interference power does not change within one STTD code block, then equation (11) can be further simplified to $$\alpha = \frac{|h_1|^2 + |h_2|^2}{\sigma_1^2}. \quad (12)$$

By comparing equation (12) with equation (8), we can see that the only difference between the two is the interference weighting factor $$\frac{1}{\sigma_1^2}.$$

Now the question is how to estimate the coloured interferences $\sigma_1^2$ and $\sigma_2^2$. Note that conventional derivations assume that $\sigma_1^2$ and $\sigma_2^2$ are Gaussian distributed.

In order to implement equation (11), the term $(|h_1|^2 \sigma_1^2 + |h_2|^2 \sigma_2^2)$ is to be estimated. In addition, this estimation is preferably based on a current received communication signal. If the estimation is based on previous signals or data, the interference estimate may not be accurate, as interference may not be the same for a current signal, due to sub-carrier hopping, for example.

To estimate $\alpha$, it is observed from equation (1) that $$\frac{h_1^*(k) n_1(k) + h_2(k) n_2^*(k)}{|h_1(k)|^2 + |h_2(k)|^2} = \frac{\tilde{s}_1(k)}{|h_1(k)|^2 + |h_2(k)|^2} - s_1(k). \quad (13)$$

If $h_1^*(k) n_1(k)$ and $h_2(k) n_2^*(k)$ are independent of each other and $E[h_1^*(k) n_1(k)] = E[h_2(k) n_2^*(k)] = 0$, then we have $$\frac{1}{\alpha} = E\left[ \left| \frac{h_1^*(k) n_1(k) + h_2(k) n_2^*(k)}{|h_1(k)|^2 + |h_2(k)|^2} \right|^2 \right] \quad (14)$$
$$= \frac{|h_1(k)|^2 \sigma_1^2(k) + |h_2(k)|^2 \sigma_2^2(k)}{(|h_1(k)|^2 + |h_2(k)|^2)^2} =$$
$$E\left[ \left| \frac{\tilde{s}_1(k)}{|h_1(k)|^2 + |h_2 + (k)|^2} - s_1(k) \right|^2 \right].$$

Therefore, $$\alpha = \frac{1}{E\left[ \left| \frac{\tilde{s}_1(k)}{|h_1(k)|^2 + |h_2 + (k)|^2} - s_1(k) \right|^2 \right]}. \quad (15)$$

Since the exact transmitted symbol $s_1(k)$ is difficult to ascertain at the time of interference estimation, we use a hard-decision value $\hat{s}_1(k)$ from the decoder 27 instead. In addition, assuming that interference is constant within the coherence bandwidth constituted of $N_c$ sub-carriers, then equation (14) can be rewritten as $$\frac{1}{\alpha} = \frac{|h_1(k)|^2 \sigma_1^2(k) + |h_2(k)|^2 \sigma_2^2(k)}{(|h_1(k)|^2 + |h_2(k)|^2)^2} \quad (16)$$
$$\approx \frac{1}{N_c} \sum_{i=1}^{N_c} \left| \frac{\tilde{s}_1(\nu N_c + i)}{|h_1(\nu N_c + i)|^2 + |h_2(\nu N_c + i)|^2} - \hat{s}_1(\nu N_c + i) \right|^2$$

where v is an integer. By observing the right side of equation (16), it can be seen that this is in fact the average noise/interference power in the normalized STTD signal domain. In actual implementations, the constant factor $$\frac{1}{N_c}$$

can be omitted.

Therefore, it will be apparent that interference weighting may involve weighting each signal component in a received communication signal based on a respective per-signal component interference estimate or weighting each signal component in each of a number of groups of signal components based on a respective per-group interference estimate. Sub-carrier signal components within a coherence bandwidth represent one example of a group of signal components that may be weighted using a per-group interference estimate.

In accordance with an embodiment of the invention, interference weighted QAM soft-demapping for multi-cell OFDM systems is achieved by applying equation (16) to equation (11). Signal components associated with each sub-carrier are preferably weighted for interference.

Note that since $s_2(k)$ is experiencing the same level of interference as $s_1(k)$, the estimated α for $s_2(k)$ can be averaged with that from $s_1(k)$ to provide a better estimate for interference weighting, provided that interference power remains the same within one STTD block.

It should be appreciated that coloured interferences may change across the frequency domain while remaining substantially constant within a relatively small sub-band such as a coherence bandwidth or between multiple receiving antennas. However, interference levels can change significantly from sub-band to sub-band, and as such, conventional assumptions that interference is constant across all sub-bands do not hold for coloured interferences.

Interference weighting for soft demapping may also be applied to other types of systems, such as MIMO.

Consider an M×N MIMO system, with a channel matrix defined as $$H = \begin{bmatrix} h_{11} & h_{12} & \ldots & h_{1M} \\ h_{21} & h_{22} & \ldots & h_{2M} \\ \vdots & \vdots & \ddots & \vdots \\ h_{N1} & h_{N2} & \ldots & h_{NM} \end{bmatrix}. \quad (17)$$

In this case, a received signal may be expressed as $$\vec{r} = H\vec{s} + \vec{n}, \quad (18)$$

where $$\vec{r} = [r_1 \quad r_2 \quad \ldots \quad r_N]^T \quad (19)$$
$$\vec{s} = [s_1 \quad s_2 \quad \ldots \quad s_M]^T$$
$$\vec{n} = [n_1 \quad n_2 \quad \ldots \quad n_N]^T.$$

With QAM modulation applied to a signal at a transmitting side using a constellation size of $2^q$, the received signal $\vec{r}$ corresponds to qM bits. The task of soft-demapping, as above, is to compute the LLR for these qM bits.

For MIMO, the decoder 27 may be a maximum likelihood (ML) decoder, for example. Those skilled in the art will appreciate that an ML decoder is defined by $$\vec{s} = \min \|\vec{r} - H\vec{s}\|, \quad (20)$$

when the components in $\vec{n}$ are drawn from independent, identically distributed wide-sense stationary processes with variance $\sigma^2$.

Interference weighting at a demapping stage as shown in FIG. 2 is applicable when the interference levels experienced by all receive antennas in a MIMO receiver are the same. In this case, from equations (18) and (20), the power of the overall interference can be shown as $$\|\vec{n}\| = \|\vec{r} - H\vec{s}\| = \sum_{i=1}^{N} |r_i - H_i \vec{s}|^2, \quad (21)$$

where $H_i$ denotes the i-th row of H. Those skilled in the art will appreciate that the soft-demapping process is then determined by $$\Lambda(b_l) = \quad (22)$$
$$\frac{1}{\sigma^2}\left(\min_{s=f(\vec{b}),b_l=0} \sum_{i=1}^{N}\left|r_i - \sum_{j=1}^{M} h_{ij}s_j\right|^2 - \min_{s=f(\vec{b}),b_l=1} \sum_{i=1}^{N}\left|r_i - \sum_{j=1}^{M} h_{ij}s_j\right|^2\right).$$

The variance $\sigma^2$ is estimated based on equation (21). A better estimate of $\sigma^2$ may be generated as an average over several sub-carriers in a sub-band, such as within the coherence bandwidth. Assuming that interference is constant within the coherence bandwidth constituted of $N_c$ sub-carriers, then the noise/interference variance $\sigma^2$ can be estimated as $$\sigma^2 \approx \frac{1}{N_c}\sum_{k=1}^{N_c}\sum_{i=1}^{N} |r_i(vN_c+k) - H_i(vN_c+k)\vec{s}(vN_c+k)|^2, \quad (23)$$

where v is an integer, and the sub-carrier indexes ($vN_c+1$ $vN_c+2 \ldots (v+1)N_c$) cover the sub-band that the estimated $\sigma^2$ is to be applied. The constant factor $$\frac{1}{N_c}$$

in equation (23) can be omitted in implementation.

Figure 3:
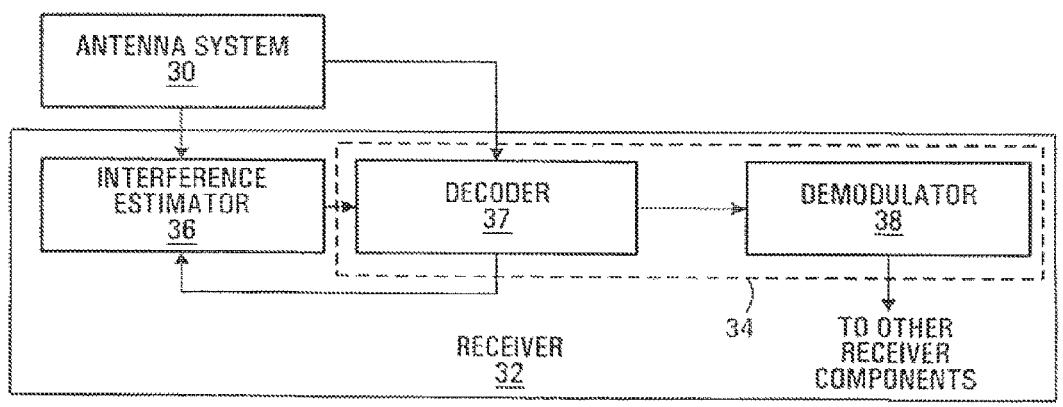
FIG. 3 is a block diagram of an example of a communication signal processing module and an interference estimator according to another embodiment of the invention.

Referring now to FIG. 3, a block diagram of an example of a communication signal processing module and an interference estimator according to another embodiment of the invention is shown. In FIG. 3, a receiver 32 is connected to an antenna system 30, and includes an interference estimator 36 and a communication signal processing module 34. The communication signal processing module 34 comprises a decoder 37 and a demodulator 38 connected to an output of the decoder 37. Both the interference estimator 36 and the decoder 37 are connected to the antenna system 30, and the decoder 37 is further connected to an output of the interference estimator 36. The interference estimator is also connected to an output of the decoder 37.

As described above, the antenna system 30 is adapted to receive communication signals from one or more transmitting antennas (not shown), the interference estimator 36 estimates interference in received communication signals, the decoder 37 implements a decoding scheme that substantially corresponds to an encoding scheme employed at a transmitting side, and the demodulator 38 demodulates information modulated onto one or more carrier signals at the transmitting side.

Comparing FIGS. 2 and 3, it will be apparent that the interference estimator 36 in the embodiment of FIG. 3 operates in conjunction with the decoder 37 instead of the demodulator 38. Thus, in this embodiment of the invention, decoding is interference weighted. Demodulation may then be performed in accordance with conventional techniques, as interference has already been compensated to some degree in the decoder.

As above, the operation of the receiver 32 will be described in detail by way of illustrative examples of STTD and MIMO. Extension of the principles applied in these examples to other communication schemes will be apparent to those skilled in the art.

One of the decoding operations performed by an STTD decoder is received signal combining. In a 2-by-2 STTD system for example, the antenna system 30 includes two antennas adapted to receive communication signals from two transmitting antennas, and a channel matrix is defined as $$H = \begin{bmatrix} h_{11} & h_{12} \\ h_{21} & h_{22} \end{bmatrix}. \tag{24}$$

Where the channel matrix H and noise/interference variances at the two receiving antennas $\sigma_1^2$ and $\sigma_2^2$ do not change within one STTD coding block, the received signals from each antenna i at time j, denoted $r_{i,j}$, can be expressed in terms of the transmitted signals $s_1$ and $s_2$ as $$r_{1,1} = h_{11}s_1 + h_{12}s_2 + n_{1,1}$$

$$r_{1,2} = h_{11}s_2^* + h_{12}s_1^* + n_{1,2}$$

$$r_{2,1} = h_{21}s_1 + h_{22}s_2 + n_{2,1}$$

$$r_{2,2} = h_{21}s_2^* + h_{22}s_1^* + n_{2,2}. \tag{25}$$

It is known, for example from S. M. Alamouti, "A Simple Transmitter Diversity Technique for Wireless Communications," *IEEE J. Select. Areas Commun.*, Vol. 16, pp. 1451-1458, October 1998, that the STTD combined signals are $$\hat{s}_1 = h_{11}^* r_{1,1} + h_{12} r_{1,2}^* + h_{21}^* r_{2,1} + h_{22} r_{2,2}^*$$

$$\hat{s}_2 = h_{12}^* r_{1,1} - h_{11} r_{1,2}^* + h_{22}^* r_{2,1} - h_{21} r_{2,2}^*, \tag{26}$$

which can be further expressed as $$\hat{s}_1 = (|h_{11}|^2 + |h_{12}|^2 + |h_{21}|^2 + |h_{22}|^2)s_1 + h_{11}^* n_{1,1} + h_{12} n_{1,2}^* + h_{21}^* n_{2,1} + h_{22} n_{2,2}^*$$

$$\hat{s}_2 = (|h_{11}|^2 + |h_{12}|^2 + |h_{21}|^2 + |h_{22}|^2)s_2 - h_{11} n_{1,2}^* + h_{12}^* n_{1,1} - h_{21} n_{2,2}^* + h_{22}^* n_{2,1}. \tag{27}$$

Where $E[h_{11}^* n_{1,1}] = E[h_{12} n_{1,2}^*] = E[h_{21}^* n_{2,1}] = E[h_{22} n_{2,2}^*] = 0$ and they are independent of each other, then the noise/interference power in $\hat{s}_1$ is $$P_{noise}(\hat{s}_1) = (|h_{11}|^2 + |h_{12}|^2)\sigma_1^2 + (|h_{21}|^2 + |h_{22}|^2)\sigma_2^2. \tag{28}$$

Similarly, it can be shown that $P_{noise}(\hat{s}_1) = P_{noise}(\hat{s}_2)$. Thus, the signal to noise ratio (SNR) of an STTD signal decoded in this manner is given by $$SNR_{EW} = \frac{(|h_{11}|^2 + |h_{12}|^2 + |h_{21}|^2 + |h_{22}|^2)^2}{(|h_{11}|^2 + |h_{12}|^2)\sigma_1^2 + (|h_{21}|^2 + |h_{22}|^2)\sigma_2^2}|s_i|^2. \tag{29}$$

When $\sigma_1^2 = \sigma_2^2$, equation (29) simplifies to $$SNR_{EW} = \frac{|h_{11}|^2 + |h_{12}|^2 + |h_{21}|^2 + |h_{22}|^2}{\sigma_1^2}|s_i|^2. \tag{30}$$

However, when $\sigma_1^2 \neq \sigma_2^2$, equation (27) does not provide optimal signal combining. In accordance with an embodiment of the invention, signal combining is interference weighted.

Equation (27) may be rewritten as $$\hat{s}_1 = \hat{s}_{1,1} + \hat{s}_{1,2}$$

$$\hat{s}_2 = \hat{s}_{2,1} + \hat{s}_{2,2}, \tag{31}$$

where $$\hat{s}_{1,1} = (|h_{11}|^2 + |h_{12}|^2)s_1 + h_{11}^* n_{1,1} + h_{12} n_{1,2}^*$$

$$\hat{s}_{1,2} = (|h_{21}|^2 + |h_{22}|^2)s_1 + h_{21}^* n_{2,1} + h_{22} n_{2,2}^*$$

$$\hat{s}_{2,1} = (|h_{11}|^2 + |h_{12}|^2)s_2 - h_{11} n_{1,2}^* + h_{12}^* n_{1,1}$$

$$\hat{s}_{2,2} = (|h_{21}|^2 + |h_{22}|^2)s_2 - h_{21} n_{2,2}^* + h_{22}^* n_{2,1}. \tag{32}$$

It is not difficult to see that $\hat{s}_{i,j}$ represents the components of the received signal for $s_i$ from antenna j, and equation (31) represents an equal combining of the signals received from the two transmitting antennas at each receiving antenna. It is this equal combining that can potentially degrade system performance in the presence of coloured interference.

With interference-weighted combining, equation (31) is modified to $$\hat{s}_1 = \frac{\hat{s}_{1,1}}{\sigma_1^2} + \frac{\hat{s}_{1,2}}{\sigma_2^2} \tag{33}$$

$$\hat{s}_2 = \frac{\hat{s}_{2,1}}{\sigma_1^2} + \frac{\hat{s}_{2,2}}{\sigma_2^2}.$$

Obviously, when $\sigma_1^2 = \sigma_2^2$, equation (33) simplifies to equation (31).

Applying equation (33) to equation (27), to provide interference-weighted signal combining, $$\hat{s}_1 = \left(\frac{|h_{11}|^2 + |h_{12}|^2}{\sigma_1^2} + \frac{|h_{21}|^2 + |h_{22}|^2}{\sigma_2^2}\right)s_1 + \frac{h_{11}^* n_{1,1} + h_{12} n_{1,2}^*}{\sigma_1^2} + \frac{h_{21}^* n_{2,1} + h_{22} n_{2,2}^*}{\sigma_2^2} \tag{34}$$

$$\hat{s}_2 = \left(\frac{|h_{11}|^2 + |h_{12}|^2}{\sigma_1^2} + \frac{|h_{21}|^2 + |h_{22}|^2}{\sigma_2^2}\right)s_2 + \frac{h_{12}^* n_{1,1} - h_{11} n_{1,2}^*}{\sigma_1^2} + \frac{h_{22}^* n_{2,1} - h_{21} n_{2,2}^*}{\sigma_2^2}.$$

From equation (34), it follows that $$SNR_{IW} = \left(\frac{|h_{11}|^2 + |h_{12}|^2}{\sigma_1^2} + \frac{|h_{21}|^2 + |h_{22}|^2}{\sigma_2^2}\right)|s_1|^2, \tag{35}$$

which, as expected, degenerates to equation (30) when $\sigma_1^2 = \sigma_2^2$.

The gain of interference-weighted signal combining over conventional signal combining, in which equal weighting is used, can be calculated from equations (35) and (29) as an SNR gain $$\gamma = \frac{SNR_{IW}}{SNR_{EW}} = \frac{\frac{|h_{11}|^2+|h_{12}|^2}{\sigma_1^2} + \frac{|h_{21}|^2+|h_{22}|^2}{\sigma_2^2}}{\frac{(|h_{11}|^2+|h_{12}|^2+|h_{21}|^2+|h_{22}|^2)^2}{(|h_{11}|^2+|h_{12}|^2)\sigma_1^2 + (|h_{21}|^2+|h_{22}|^2)\sigma_2^2}} \quad (36)$$

$$= \frac{(|h_{11}|^2+|h_{12}|^2)^2 + \left(\frac{\sigma_1^2}{\sigma_2^2}+\frac{\sigma_2^2}{\sigma_1^2}\right)(|h_{11}|^2+|h_{12}|^2)(|h_{21}|^2+|h_{22}|^2) + (|h_{21}|^2+|h_{22}|^2)^2}{(|h_{11}|^2+|h_{12}|^2+|h_{21}|^2+|h_{22}|^2)^2}$$

$$= K_1 + K_2\left(\frac{\sigma_1^2}{\sigma_2^2}+\frac{\sigma_2^2}{\sigma_1^2}\right) + K_3,$$

where $$K_1 = \frac{(|h_{11}|^2+|h_{12}|^2)^2}{(|h_{11}|^2+|h_{12}|^2+|h_{21}|^2+|h_{22}|^2)^2} \quad (37)$$

$$K_2 = \sqrt{K_1 K_3}$$

$$K_3 = \frac{(|h_{21}|^2+|h_{22}|^2)^2}{(|h_{11}|^2+|h_{12}|^2+|h_{21}|^2+|h_{22}|^2)^2}.$$

From equations (36) and (37), it can be seen that $K_1$ and $K_3$ are determined by the channel matrix, and the only term in equation (13) that is influenced by interference unbalancing is $$\eta = K_2\left(\frac{\sigma_1^2}{\sigma_2^2}+\frac{\sigma_2^2}{\sigma_1^2}\right), \quad (38)$$

which can be dominant when $\sigma_1^2 \neq \sigma_2^2$.

For interference-weighted signal combining, $\sigma_1^2$ and $\sigma_2^2$ are to be estimated. From equation (32), we have $$\frac{P_{noise}(\hat{s}_{1,1}) = E[|\hat{s}_{1,1}-(|h_{11}|^2+|h_{12}|^2)s_1|^2] = (|h_{11}|^2+|h_{12}|^2)}{\sigma_1^2}$$

$$\frac{P_{noise}(\hat{s}_{1,2}) = E[|\hat{s}_{1,2}-(|h_{21}|^2+|h_{22}|^2)s_1|^2] = (|h_{21}|^2+|h_{22}|^2)}{\sigma_2^2}$$

$$\frac{P_{noise}(\hat{s}_{2,1}) = E[|\hat{s}_{2,1}-(|h_{11}|^2+|h_{12}|^2)s_2|^2] = (|h_{11}|^2+|h_{12}|^2)}{\sigma_1^2}$$

$$\frac{P_{noise}(\hat{s}_{2,2}) = E[|\hat{s}_{2,2}-(|h_{21}|^2+|h_{22}|^2)s_2|^2] = (|h_{21}|^2+|h_{22}|^2)}{\sigma_2^2}. \quad (39)$$

Therefore, from equations (31)-(33) and (39), $$\sigma_1^2 \approx \sum\left(\left|\frac{\hat{s}_{1,1}}{(|h_{11}|^2+|h_{12}|^2)}-s_1\right|^2+\left|\frac{\hat{s}_{2,1}}{(|h_{11}|^2+|h_{12}|^2)}-s_2\right|^2\right) \quad (40)$$

$$\sigma_2^2 \approx \sum\left(\left|\frac{\hat{s}_{1,2}}{(|h_{21}|^2+|h_{22}|^2)}-s_1\right|^2+\left|\frac{\hat{s}_{2,2}}{(|h_{21}|^2+|h_{22}|^2)}-s_2\right|^2\right).$$

The summation in equation (40) is preferably over subcarriers within the coherence bandwidth for OFDM based systems or the coherence time for Time Division Multiplexing (TDM) based systems. As such, estimation results can be applied to groups of signal components within the same coherence bandwidth or time.

It will be apparent that $s_1$ and $s_2$ are not initially known when a communication signal is received. To use equation (40), hard-decision results derived from equation (27) are used instead. Although each individual receiving antenna can be relied upon for hard-decision results for interference estimates, equation (27) provides not only higher order diversity, but also statistically higher SNR as well, relative to interference-weighted signal combining. Where hard-decision results for $s_1$ and $s_2$ are used in equation (40), it will be apparent that $\sigma_1^2$ and $\sigma_2^2$ are actually represented by the norm between the normalized received signals and their hard-decision results.

It should be noted that first-pass hard-decision results are used for interference estimation, and the interference estimates are then used to weight signals during decoding. The interference estimates or weights determined on the basis of such estimates are applied in the decoder 37 of FIG. 3. Therefore, although initial hard-decision results used for interference estimation may be determined in accordance with conventional techniques and thus prone to error as described above, subsequent weighting of signals during decoding at least partially compensates the effects of unbalanced interference.

Interference-weighted STTD signal combining in an STTD decoder as described above does not change the diversity order, but improves the SNR of the combined signals.

In embodiments of the invention such as shown in FIG. 3, in which interference weighting is applied to decoding operations, no further weighting for interference is needed for demodulation or demapping. With interference-weighted STTD signal combining as described above, for example, interference is effectively normalized. In fact, equation (34) can be rewritten as $$\hat{s}_1 = (|\tilde{h}_{11}|^2+|\tilde{h}_{12}|^2+|\tilde{h}_{21}|^2+|\tilde{h}_{22}|^2)s_1 + \tilde{h}_{11}^*\tilde{n}_{1,1} + \tilde{h}_{12}\tilde{n}_{1,2}^* + \tilde{h}_{21}^*\tilde{n}_{2,1} + \tilde{h}_{22}\tilde{n}_{2,2}^*$$

$$\hat{s}_2 = (|\tilde{h}_{11}|^2+|\tilde{h}_{12}|^2+|\tilde{h}_{21}|^2+|\tilde{h}_{22}|^2)s_2 + \tilde{h}_{12}^*\tilde{n}_{1,1} - \tilde{h}_{11}\tilde{n}_{1,2}^* + \tilde{h}_{22}^*\tilde{n}_{2,1} - \tilde{h}_{21}\tilde{n}_{2,2}^*, \quad (41)$$

where $$\tilde{h}_{11} = \frac{h_{11}}{\sigma_1}, \tilde{h}_{12} = \frac{h_{12}}{\sigma_1}, \tilde{h}_{21} = \frac{h_{21}}{\sigma_2}, \tilde{h}_{22} = \frac{h_{22}}{\sigma_2}, \text{ and}$$

$$\tilde{n}_{1,1}, \tilde{n}_{1,2}, \tilde{n}_{2,1}, \tilde{n}_{2,2}$$

have unit variance.

As described above, interference weighting may be applied to either demodulation or decoding in an STTD system. Similarly, both these embodiments of interference weighting may also be applied to MIMO systems. A MIMO system having an ML decoder, and in which the interference experienced by each receiving antenna is not the same, is described below as a further example of a system to which interference-weighted signal combining may be applied.

Let $\vec{\sigma}=[\sigma_1^2 \ \sigma_2^2 \ \ldots \ \sigma_N^2]^T$ be the variance vector corresponding to a transmitted signal $\vec{s}$, having elements ($\sigma_i^2$, $1 \le i \le N$) that are not necessarily equal to each other. Then the ML decoder defined in equation (20) is modified to $$\hat{\vec{s}} = \min\left\|\frac{\vec{r}-H\vec{s}}{\vec{\sigma}}\right\|, \quad (42)$$

where the division is element-based. In other words, according to an embodiment of the invention, an ML decoder is interference weighted when receive antennas do not experience the same level of interference. So, to perform interference-weighted ML detection, the distribution of interference power among receive antennas is either estimated or assumed to be uniform. Generally speaking, it can be safely assumed that the average interference power experienced by each receive antenna is the same for all the receive antennas. However, due to Rayleigh fading, for example, the short-term interference power experienced by each receive antenna can be different.

One advantage of ML decoding over such other encoding schemes as zero-forcing (ZF) and Minimum Mean Squared Error (MMSE) decoding is that noise is not enhanced by ML decoding. From equation (20), it can be seen that no noise enhancement occurs during ML decoding. Although ZF and MMSE decoding provide for interference cancellation, as will be appreciated by those skilled in the art, classical ML decoding is not optimized for interference cancellation, such that each component of a received signal can individually be weighted by its own interference power in accordance with an aspect of the invention, as shown in equation (42).

From equation (20), it follows that the elements $\sigma_i^2$ of $\vec{\sigma}$, for implementation of decoding according to equation (42), are given by $$\sigma_i^2 = \qquad (43)$$

$$E[|r_i - H_i \vec{s}|^2] \approx \frac{1}{N_c} \sum_{k=1}^{N_c} \left| r_i(vN_c + k) - \sum_{j=1}^{M} h_{ij}(vN_c + k)s_j(vN_c + k) \right|^2.$$

However, as described above, the transmitted signal $\vec{s}$ is unknown at the time of interference estimation, so first-cut hard-decision estimates $\hat{\vec{s}}$, obtained from equation (20), are used in equation (43) to estimate interference. The estimated elements $\sigma_i^2$ are then used to weight $|r_i - H_i \vec{s}|^2$, with a weighting factor of $$\frac{1}{\sigma_i^2}.$$

Next, interference-weighted hard-decision estimates $\hat{\vec{s}}$ from equation (42) are obtained.

Where the first-cut and interference-weighted hard decisions disagree, by more than some predetermined threshold amount or tolerance, for example, then the estimation and weighting steps are preferably repeated, using the interference-weighted hard decision from a preceding iteration. Since most of the elements in $\hat{\vec{s}}$ will likely agree with each other, interference power estimates should be more reliable than one single element in $\hat{\vec{s}}$. Therefore, when the first-cut and interference-weighted hard-decision results do not agree with each other, as determined on the basis of a Euclidean distance therebetween, for example, it is more likely that the interference-weighted hard-decision results obtained using equation (42) are correct. By repeating the estimation and weighting operations, $\sigma_i^2$, $r_i$ and $H_i$ are actually being updated for soft-demapping. Changes in these parameters should be small in most cases, but the final results are better refined.

After one or more iterations of interference estimation and weighting have been completed, soft demapping of the decoded signal is performed $$\Lambda(b_l) = \min_{s=f(\vec{b}), b_l=0} \sum_{i=1}^{N} \left| r_i - \sum_{j=1}^{M} h_{ij} s_j \right|^2 - \min_{s=f(\vec{b}), b_l=1} \sum_{i=1}^{N} \left| r_i - \sum_{j=1}^{M} h_{ij} s_j \right|^2. \qquad (44)$$

As described above, no further interference weighting is needed during demapping where decoding involves interference weighting.

The above examples illustrate interference weighting of received communication signals during either decoding or demodulation.

Figure 4:
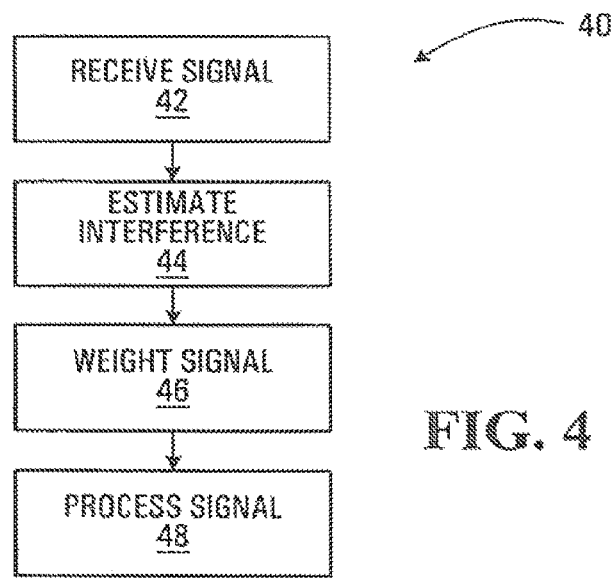
FIG. 4 is a flow diagram of a method in accordance with an embodiment of the invention.

FIG. 4 is a flow diagram of a method in accordance with an embodiment of the invention. In the method 40, a communication signal is received at 42. It will be apparent from the foregoing that the communication signal received at comprises a plurality of signal components, and may comprise multiple communication signals, as in the case of STTD and MIMO for example. At 44, interference by which the received communication signal components are affected is estimated. The interference estimate, or a weight determined on the basis of the estimate, is then used at 46 to weight the signal components of the communication signal at 46, and the weighted signal is processed at 48. Examples of interference estimation, weighting, and processing at 44, 46, and 48 have been described in detail above. In the examples described above with reference to FIG. 2, interference weighting is applied to signal components during demodulation or demapping, whereas in the examples relating to FIG. 3, interference weighting is performed during decoding operations.

Although shown as separate operations in FIG. 4, it will be apparent that there may be some overlap between these operations in some embodiments of the invention. For example, as described above, interference estimation at 44 may use first-pass hard-decision values generated during decoding of a received signal. The interference estimate, or a weight determined using the estimate, is then applied to the received signal, such as during decoding or demodulation of the signal.

Figure 5:
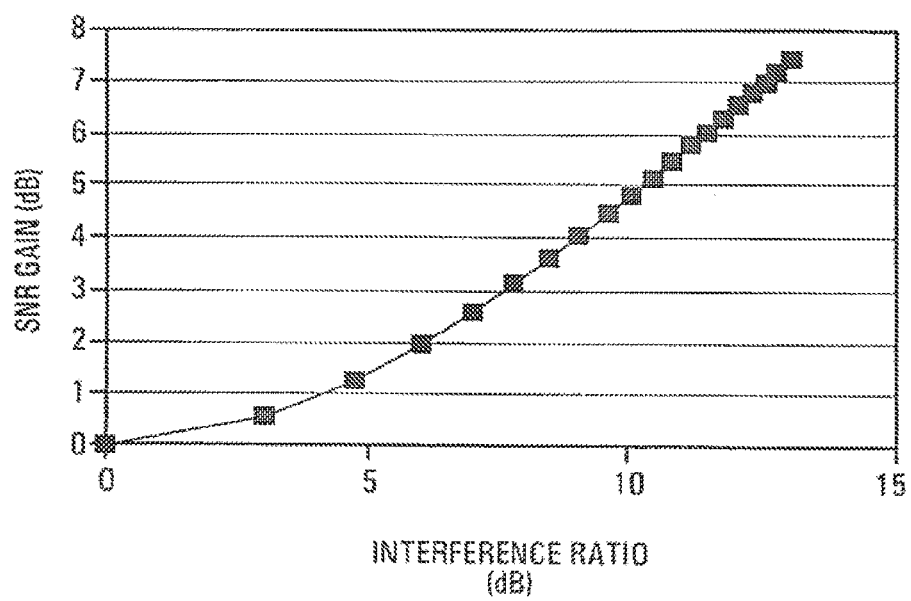
FIG. 5 is a plot illustrating an example signal to noise ratio (SNR) gain characteristic relative to interference imbalance.

The overall effect of interference weighting varies according to the degree of interference imbalance. FIG. 5 is a plot illustrating an example SNR gain characteristic relative to interference imbalance.

FIG. 5 shows SNR gain $\gamma$, defined above in equation (36), versus interference ratio $$\frac{\sigma_1^2}{\sigma_2^2}$$

for interference-weighted 2-by-2 STTD signal combining as described above. Solely for illustrative purposes, it has been assumed that $K_1=K_3=0.5$ which, from equation (37), gives $K_2=0.5$. From equation (36), when $\sigma_1^2=\sigma_2^2$, $\gamma=1$. It is apparent from FIG. 5 that the speed of performance deterioration for non-weighted signal combining relative to interference-weighted combining increases when interference unbalancing between the two receiving antennas becomes more severe.

What has been described is merely illustrative of the application of the principles of the invention. Other arrangements and methods can be implemented by those skilled in the art without departing from the spirit and scope of the present invention.

For example, the invention is in no way restricted to the above examples of STTD and MIMO. Embodiments of the invention may be implemented in virtually any system affected by coloured or bursty interference. Interference weighting according to aspects of the invention is local in that no coordination among neighbouring base stations or coverage areas is required), simple in that interference estimation and weighting are not expensive in terms of DSP real-time, and effective in that the performance of a Turbo code, for instance, in a coloured-interference environment can be improved.

Interference weighting is also not restricted to particular modulations. Although QAM is described in detail above, the interference weighting may also be used in conjunction with other modulation schemes, including phase shift keying modulation techniques such as quadrature phase shift keying (QPSK) for instance, which is also common in STTD systems.

The invention is similarly applicable to other types of decoders. In the above description, for example, MIMO is presented in the context of ML decoding, although ZF/MMSE decoding may also be implemented in a MIMO system. One possible issue to consider when selecting ML or ZF/MMSE decoding is whether ZF/MMSE would provide better performance when the power distribution of $\vec{n}$ in equation (18) is unknown. Applying the Moore-Penrose pseudo-inverse matrix $G=(H^*H)^{-1} H^*$ to equation (18), $$\vec{\tilde{s}} = (H^*H)^{-1} H^* \vec{r} - (H^*H)^{-1} H^* \vec{n}. \tag{45}$$

It is clear that the power distribution of $\vec{n}$ is not taken into account in the calculation of the Moore-Penrose pseudo-inverse matrix G. Note also that equation (45) is designed for interference cancellation, and no consideration is typically given to optimal signal-combining to achieve better SNR.

However, interference weighting according to aspects of the invention may still be applied in conjunction with a receiver in which ZF/MMSE decoding is implemented. If $\vec{g}_i$ denotes the i-th row of the Moore-Penrose pseudo-inverse matrix $G=(H^*H)^{-1} H^*$, then from equation (45), the noise power in $\tilde{s}_i$ is given by $$\sigma^2(\tilde{s}_i) = \sum_j |g_{ij}|^2 \sigma_j^2, \tag{46}$$

where $g_{ij}$ is an element in G, and $$\vec{\tilde{s}} = G\vec{r} = \vec{s} + G\vec{n}. \tag{47}$$

Since a ZF system is optimized for interference cancellation, any normalization of the rows in H will be compensated in the calculation of G according to the known SIR criterion. So for ZF, it can be concluded that no interference weighting can be applied at the decoding stage. This does not preclude weighting at a demodulation or demapping stage. At a soft-demapping stage, the demapped value of $\tilde{s}_i$ is preferably weighted by the factor of $$\frac{1}{\sigma^2(\tilde{s}_i)},$$

where $\sigma^2(\tilde{s}_i)$ is calculated according to equation (42). Note that when $\sigma_j^2$ remains a constant across antennas and subcarriers, equation (46) is degenerated to $$\sigma^2(\tilde{s}_i) = \sum_j |g_{ij}|^2. \tag{48}$$

A determination as to whether receiving antennas will experience different levels of interference is often known at the time of system deployment, and a conventional or interference-weighted decoding or demodulation algorithm may thus be selected accordingly. However, as interference weighting in accordance with aspects of the invention estimates interference and performs weighting accordingly, interference-weighted received signal processing effectively automatically adjusts itself for a current operating environment and thus may be used whether or not coloured interference is expected.

We claim:

1. A non-transitory, computer accessible memory medium storing program instructions for processing communication signals by a communication signal receiver, wherein the program instructions, when executed, cause the communication signal receiver to:
receive at least one communication signal, the at least one communication signal comprising a plurality of signal components;
estimate interference affecting the at least one received communication signal to obtain at least a first interference estimate based on a first modulated symbol of a first signal component from the plurality of signal components; and
apply a first weight based on the first interference estimate to a first signal component of the plurality of signal components to obtain a first weighted signal component.

2. The non-transitory, computer accessible memory medium of claim 1, wherein the program instructions, when executed, further cause the communication signal receiver to decode the first weighted signal component.

3. The non-transitory, computer accessible memory medium of claim 2, wherein receiving the at least one communication signal comprises receiving a plurality of communication signals, and decoding comprises combining at least one weighted signal component of each of the plurality of received communication signals.

4. The non-transitory, computer accessible memory medium of claim 3, wherein the signal combining uses hard-decision estimates.

5. The non-transitory, computer accessible memory medium of claim 4, wherein the hard-decision estimates are generated using summations over a coherence bandwidth of Orthogonal Frequency Division Multiplexing (OFDM) signals.

6. The non-transitory, computer accessible memory medium of claim 1, wherein receiving the at least one communication signal comprises receiving a plurality of communication signals.

7. The non-transitory, computer accessible memory medium of claim 6, wherein the communication signals comprise diversity signals in a Space-Time Transmit Diversity (STTD) system.

8. The non-transitory, computer accessible memory medium of claim 7, wherein the diversity signals are Orthogonal Frequency Division Multiplexing (OFDM) signals, and wherein the plurality of signal components comprises subcarrier signals.

9. The non-transitory, computer accessible memory medium of claim 7, wherein the STTD system is a 2-by-2 STTD system.

10. The non-transitory, computer accessible memory medium of claim 1, wherein receiving the at least one communication signal comprises receiving a plurality of communication signals, and wherein the communication signals comprise received communication signals in a Multiple Input Multiple Output (MIMO) system.

11. The non-transitory, computer accessible memory medium of claim 1, wherein the program instructions, when executed, further cause the communication signal receiver to decode the first weighted signal component, wherein the decoding comprises interference-weighted hard-decision decoding.

12. The non-transitory, computer accessible memory medium of claim 11, wherein applying comprises applying at least the first weight to each signal component in a first group of signal components that includes the first signal component, and wherein the program instructions, when executed, further cause the communication signal receiver to apply a second weight to each signal component in a second group of signal components.

13. The non-transitory, computer accessible memory medium of claim 11, wherein decoding further comprises generating first-cut hard-decision estimates of the at least one communication signal and using the first-cut hard-decision estimates in the interference-weighted hard-decision decoding.

14. The non-transitory, computer accessible memory medium of claim 13, wherein the program instructions, when executed, further cause the communication signal receiver to determine whether the first-cut hard-decision estimates are within a tolerance of results of the interference-weighted hard-decision decoding, and if not, repeat the interference-weighted hard-decision decoding using the interference-weighted hard-decision decoding results.

15. The non-transitory, computer accessible memory medium of claim 14, wherein determining whether the first-cut hard-decision estimates are within the tolerance of the interference-weighted hard-decision decoding results comprises measuring the Euclidean distance between the first-cut hard-decision estimates and the interference-weighted hard-decision decoding results.

16. The non-transitory, computer accessible memory medium of claim 1, wherein the program instructions, when executed, further cause the communication signal receiver to demodulate the plurality of signal components to generate demodulated signal components, and apply respective weights to at least two of the demodulated signal components.

17. The non-transitory, computer accessible memory medium of claim 16, wherein receiving the at least one communication signal comprises receiving a plurality of communication signals, and wherein demodulating comprises determining a log likelihood ratio of each bit of a modulation symbol mapped to signal components of transmitted signals respectively corresponding to the plurality of signal components of the received communication signals, and wherein the program instructions, when executed, further cause the communication signal receiver to apply respective weights to the log likelihood ratio with respective estimates of interference power.

18. The non-transitory, computer accessible memory medium of claim 17, wherein the program instructions, when executed, further cause the communication signal receiver to decode the received communication signals to generate decoded communication signal components, and wherein demodulating comprises demodulating the decoded communication signal components.

19. The non-transitory, computer accessible memory medium of claim 18, wherein the decoded communication signal components comprise a first plurality of decoder output signal components and a second plurality of decoder output signal components, and wherein demodulating comprises determining the log likelihood ratio for each decoder output signal component.

20. The non-transitory, computer accessible memory medium of claim 1, wherein the non-transitory, computer accessible memory medium is comprised in a mobile station.

21. A mobile station configured to process communication signals, wherein the mobile station comprises:
a receiver, configured to receive at least one communication signal, the at least one communication signal comprising a plurality of signal components;
processing hardware coupled to the receiver, wherein the processing hardware is configured to:
estimate interference affecting the received at least one communication signal to obtain at least a first interference estimate based on a first modulated symbol of a first signal component from the plurality of signal components; and
apply a first weight based on the first interference estimate to the first signal component of the plurality of signal components to obtain a first weighted signal component.

22. The mobile station of claim 21, wherein the processing hardware is further configured to decode the first weighted signal component.

23. The mobile station of claim 22, wherein receiving the at least one communication signal comprises receiving a plurality of communication signals, and decoding comprises combining at least one weighted signal component of each of the plurality of received communication signals.

24. The mobile station of claim 23, wherein the signal combining uses hard-decision estimates.

25. The mobile station of claim 24, wherein the hard-decision estimates are generated using summations over a coherence bandwidth of Orthogonal Frequency Division Multiplexing (OFDM) signals.

26. The mobile station of claim 21, wherein receiving the at least one communication signal comprises receiving a plurality of communication signals.

27. The mobile station of claim 26, wherein the communication signals comprise diversity signals in a Space-Time Transmit Diversity (STTD) system.

28. The mobile station of claim 27, wherein the diversity signals are Orthogonal Frequency Division Multiplexing (OFDM) signals, and wherein the plurality of signal components comprises sub-carrier signals.

29. The mobile station of claim 27, wherein the STTD system is a 2-by-2 STTD system.

30. The mobile station of claim 21, wherein receiving the at least one communication signal comprises receiving a plurality of communication signals, and wherein the communication signals comprise received communication signals in a Multiple Input Multiple Output (MIMO) system.

31. The mobile station of claim 21, wherein the processing hardware is further configured to decode the first weighted signal component, wherein the decoding comprises interference-weighted hard-decision decoding.

32. The mobile station of claim 31, wherein applying comprises applying at least the first weight to each signal component in a first group of signal components that includes the first signal component and applying a second weight to each signal component in a second group of signal components.

33. The mobile station of claim 31, wherein decoding further comprises generating first-cut hard-decision estimates of the at least one communication signal and using the first-cut hard-decision estimates in the interference-weighted hard-decision decoding.

34. The mobile station of claim 33, wherein the processing hardware is further configured to determine whether the first-cut hard-decision estimates are within a tolerance of results of the interference-weighted hard-decision decoding, and if not, repeat the interference-weighted hard-decision decoding using the interference-weighted hard-decision decoding results.

35. The mobile station of claim 34, wherein determining whether the first-cut hard-decision estimates are within the tolerance of the interference-weighted hard-decision decoding results comprises measuring the Euclidean distance between the first-cut hard-decision estimates and the interference-weighted hard-decision decoding results.

36. The mobile station of claim 21, wherein the processing hardware is further configured to demodulate the plurality of signal components to generate demodulated signal components, and apply respective weights to at least two of the demodulated signal components.

37. The mobile station of claim 36, wherein receiving the at least one communication signal comprises receiving a plurality of communication signals, and wherein demodulating comprises determining a log likelihood ratio of each bit of a modulation symbol mapped to signal components of transmitted signals respectively corresponding to the plurality of signal components of the received communication signals, and wherein the processing hardware is further configured to apply respective weights to the log likelihood ratio with respective estimates of interference power.

38. The mobile station of claim 37, wherein the processing hardware is further configured to decode the received communication signals to generate decoded communication signal components, and wherein demodulating comprises demodulating the decoded communication signal components.

39. The mobile station of claim 38, wherein the decoded communication signal components comprise a first plurality of decoder output signal components and a second plurality of decoder output signal components, and wherein demodulating comprises determining the log likelihood ratio for each decoder output signal component.

* * * * *